(12) United States Patent
Duff

(10) Patent No.: US 7,417,624 B2
(45) Date of Patent: Aug. 26, 2008

(54) ZERO-FORCE KEY ACTIVATION KEYBOARD WITH DYNAMIC INDIVIDUAL KEY ILLUMINATION

(76) Inventor: Michael J. Duff, 3400 Stevenson Blvd. Apt. K31, Fremont, CA (US) 94538

( * ) Notice: Subject to any disclaimer, the term of this patent is extended or adjusted under 35 U.S.C. 154(b) by 965 days.

(21) Appl. No.: 10/779,359

(22) Filed: Feb. 13, 2004

(65) Prior Publication Data

US 2004/0159779 A1    Aug. 19, 2004

Related U.S. Application Data

(60) Provisional application No. 60/447,573, filed on Feb. 14, 2003.

(51) Int. Cl.
*G01D 11/28* (2006.01)
(52) U.S. Cl. .................. 345/168; 345/156; 345/169; 345/170; 345/205; 341/22; 362/24; 362/26
(58) Field of Classification Search ............ 345/156, 345/168, 169, 170, 205, 207; 341/22; 362/24, 362/26, 84, 109
See application file for complete search history.

(56) References Cited

U.S. PATENT DOCUMENTS

| | | | | |
|---|---|---|---|---|
| 3,372,789 | A | * | 3/1968 | Heinz et al. ............ 400/479 |
| 4,163,883 | A | * | 8/1979 | Boulanger ............ 200/314 |
| 4,334,280 | A | * | 6/1982 | McDonald ............ 708/136 |
| 5,909,028 | A | * | 6/1999 | Yamamoto ............ 250/221 |
| 6,590,508 | B1 | | 7/2003 | Howell et al. |
| 6,609,805 | B1 | | 8/2003 | Nelson |
| 6,648,530 | B2 | | 11/2003 | Kamei et al. |
| 6,657,616 | B2 | | 12/2003 | Sims |
| 6,677,931 | B2 | | 1/2004 | Chi et al. |
| 2001/0002166 | A1 | * | 5/2001 | Katrinecz et al. ............ 362/84 |
| 2001/0048379 | A1 | * | 12/2001 | Kaikuranta et al. ........ 341/22 |
| 2003/0067758 | A1 | * | 4/2003 | Shipman ............ 362/26 |
| 2003/0202336 | A1 | * | 10/2003 | Ostergard et al. ............ 362/26 |

* cited by examiner

*Primary Examiner*—Bipin Shalwala
*Assistant Examiner*—Vince E Kovalick
(74) *Attorney, Agent, or Firm*—Guerin & Rodriguez, LLP; Michael A. Rodriguez

(57) ABSTRACT

Described is a zero-force key activation keyboard with individual key illumination. The keyboard includes a non-moving key for causing generation of an input signal when activated. The key has a depressed surface defining an approximately concave well with sides forming an open region sized to receive a tip of a finger. A light emitter positioned on one side of the well emits a beam of light across the open region to an opposite side of the well. A light detector is positioned on the opposite side of the well to receive the light beam and to signal activation of the key when the light beam is obstructed from being received by the light detector. Each key is illuminated from within the well. When the key is activated, its illumination color can change. Upon release, the illumination color returns immediately or gradually back to a previous color or unlighted state.

27 Claims, 10 Drawing Sheets

ZERO-FORCE KEY ACTIVATION KEYBOARD WITH DYNAMIC INDIVIDUAL KEY ILLUMINATION

RELATED APPLICATION

This application claims the benefit of the filing date of U.S. Provisional Application, Ser. No. 60/447,573, filed Feb. 14, 2003, titled "Zero-Force Key Activation Keyboard with Individual Key Illumination," the entirety of which provisional application is incorporated by reference herein.

FIELD OF THE INVENTION

The invention relates generally to input devices for computing systems. More particularly, the invention relates to a keyboard with zero-force activation keys and dynamic key illumination for use as an input device to a computing device.

BACKGROUND

Computer keyboards (hereafter, keyboards), for entering data and commands into a computer, have many different design shapes and sizes. Most current keyboards require the user to exert a downward force on a key to generate a key event. Given that keyboards have become so widely used by so many people today, and that many people spend a significant amount of time operating a keyboard each day, serious health conditions associated with keyboard use are now commonplace.

In general, these health conditions are referred to as repetitive strain injuries (RSI). They are triggered by small, prolonged and repetitious strains in the hands and arms of a keyboard operator. These strains can cause pain, weakness, or numbness in the keyboard operator's muscles, tendons, and nerves of the neck, shoulder, forearm, and hand. The sudden stop of a keystroke at the end of its downward motion, for instance, can aggravate RSI symptoms.

Proper typing form dictates that it is best to keep one's hands elevated above the keyboard and lightly press each key. Many keyboards today encourage poor typing form by providing wrist rests, which are pads intended to support one's wrists while typing. This typing position leads to RSI conditions such as carpal tunnel syndrome. Keyboards also often include kick stands mounted on the underside. These kick stands are typically located toward the rear of the keyboard with respect to the operator. When fixed in place, the kick stands elevate the rear side of the keyboard. This orientation encourages the operator to flex his hand upward (i.e., dorsiflexion) to reach the keys, while possibly resting his palms on a wrist rest. This hand position, too, is known to aggravate RSI symptoms, and has been correlated with carpal tunnel syndrome cases.

Keyboard manufacturers have responded to increasing incidences of RSI with ergonomic keyboards. Although helpful, these ergonomic keyboards do not alleviate a primary cause of RSI conditions, that is, the repetitive strain of pressing the keys. One manufacturer has a keyboard requiring only a soft touch to activate keys. Notwithstanding, the light taps required to activate the keys can still inflame and worsen RSI symptoms. Also, to achieve the soft-touch activation, the keyboard surface is generally flat, and, with the exception of small raised dots on some keys, provides little tactile feedback for the operator to determine where his hands are located on the keyboard. Consequently, the fingers of the operator can drift across the keyboard and activate the incorrect keys.

Most keyboards comprise moving parts. Each key of the keyboard typically includes three or more physically moving parts: the key housing, the spring, and the actuator. Moving parts are susceptible to wear and necessitate crevices between the keys to enable the keys to operate freely. These crevices, however, make the keyboards especially vulnerable to liquid spills and to particles of food and dirt.

Traditional keyboards with moving parts also make a mechanical clicking sound when the operator presses the keys. This clicking sound results from the physical key movement and sudden stop of downward motion when the key is fully depressed. Although this audible feedback may help the typist, the sound can become a nuisance, for example, where multiple operators are typing in close proximity to each other, or when a customer of a call center hears a computer operator typing while talking to her on the telephone. Keyboard manufacturers have recognized this problem and offer quiet keyboards, but even these quiet keyboards emit a clicking sound, however faint, when the keys are pressed.

Most keyboards also become difficult to use in low-light conditions. Because many computer users need to look at the keys often to type accurately, when the lighting is insufficient to see the keys clearly, the operator tends to make typing mistakes more frequently, thereby reducing his effective typing speed and increasing frustration. One currently produced keyboard shines light between its keys. The light coming from between the crevices, however, is insufficient to enable the operator to discern the characters represented by the keys. Keyboard clip-on lights are available, but their use is awkward and not well-suited to the varying shapes and styles of keyboards.

SUMMARY

In one aspect, the invention features an input device comprising a key for causing generation of a key event when the key is activated. The key has a concave surface that forms a well with an open interior region defined by sides of the well. A light emitter positioned at one side of the well emits a beam of light across the open interior region to an opposite side of the well. A light detector is positioned at the opposite side of the well for receiving the beam of light and for indicating activation of the key when the beam of light is obstructed from being received by the light detector.

In another aspect, the invention features a method for generating a key event to be sent to a computing device. The method comprises associating a key structure with the key event. A beam of light is emitted from one side of the key structure to an opposite side of the key structure. The beam of light is detected at the opposite side of the key structure. Activation of the key structure is signaled upon detecting obstruction to the beam of light.

In still another aspect, the invention features a keyboard for providing key events to a computing device. The keyboard includes a plurality of keys. Each key causes generation of an associated key event when that key is activated. The keyboard also includes a light source system illuminating each key independently of the other keys of the plurality of keys.

In another aspect, the invention features a keyboard for providing key events to a computing device. The keyboard comprises a key for causing generation of a key event when the key is activated. The keyboard also includes means for activating the key without physically touching the key.

In still another aspect, the invention features a keyboard for providing key events to a computing device. The keyboard comprises a key for causing generation of a key event when the key is activated, and means for activating the key without physically touching the key.

In yet another aspect, the invention features a computing device comprising an input device for receiving input signals from a user of the computing device. The input device has a plurality of keys. Each key causes generation of an associated key event when that key is activated. Each key has a concave surface that forms a well with sides and an open region defined by the sides. A light emitter positioned on one side of the well emits a beam of light across the open region to an opposite side of the well. A light detector is positioned at the opposite side of the well for receiving the beam of light and for indicating activation of that key when the beam of light emitted by the light emitter is obstructed from being received by the light detector.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
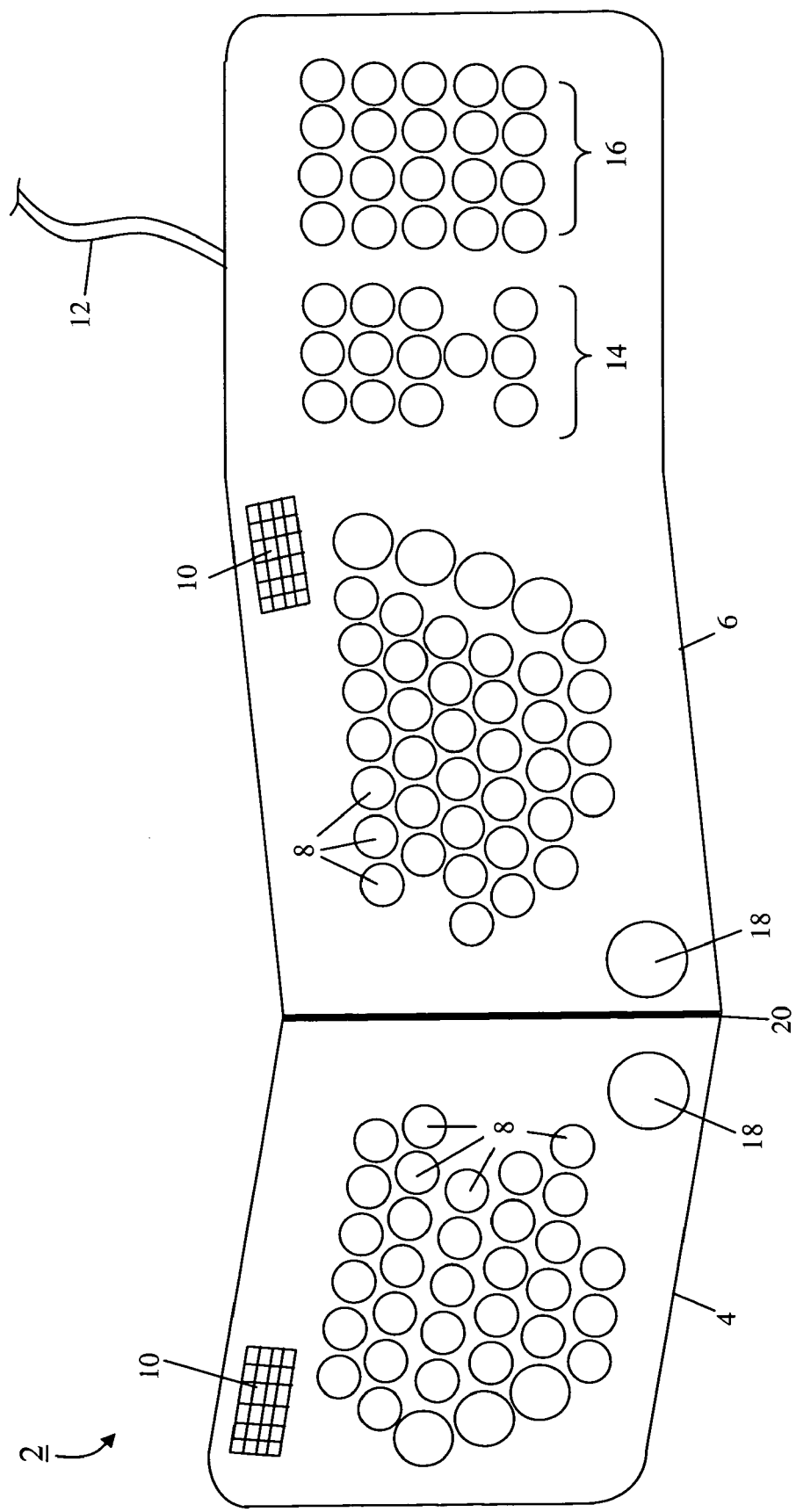
FIG. 1 is a top view of an embodiment of a keyboard constructed in accordance with the invention.

FIG. 1 shows an embodiment of a keyboard 2 constructed in accordance with the invention. The keyboard 2 includes a plurality of adjoining sections 4, 6. In one embodiment, the sections 4, 6 are separable, as described in more detail below. Each section 4, 6 includes a plurality of keys 8 and, optionally, a speaker 10. The shape of the keyboard 2 shown is exemplary, being used primarily for the purpose of illustrating the invention. For example, the base of the keyboard 2 can be extended in the front to provide rests for the wrists and hands of the operator, or the size of the keyboard 2 can vary to accommodate the number of keys supported.

A cable 12 connects the keyboard 2 to a computing device (not shown) for data transmission and electrical power. Examples of computing devices include, but are not limited to, personal computers, laptop computers, and personal digital assistants (PDAs). Although shown and described as a separate, stand-alone device, the keyboard 2 can be integrated with the computing device, for example, as a keyboard for a laptop computer. In another embodiment of a standalone device, the keyboard 2 does not have the cable 12; that is, the keyboard 2 is not tethered to the computing device. In this embodiment, the keyboard 2 sends data to the computing device data by wireless transmission (e.g., infrared, electromagnetic signals) and can obtain power from a local power source (e.g., batteries).

The left section 4 and right section 6 of the keyboard 2 are constructed of the same materials and in a similar fashion, as described further below in connection with FIG. 3. Combined, the left and right sections 4, 6 provide a zero-force key for each of the letters of the alphabet, numbers, symbols, and special function keys. (As used herein, zero-force means that an operator does not need to actually touch or contact the key to activate it.) The left section 4 includes those keys 8 traditionally on the left-hand side of a standard QWERTY keyboard, and the right section 6 includes those keys 8 traditionally on the right-hand side of a standard QWERTY keyboard. The right section 6 optionally includes special-function keys 14 (e.g., UP, DOWN, LEFT, and RIGHT arrow keys, HOME, END, etc.) and a number pad 16. These special-function keys 14, 16 are common on extended computer keyboards. Other embodiments of keyboards can have fewer keys, more keys, different or the same key characters or special functions, or different arrangements than those described or shown without departing from the principles of the invention. For embodiments with separable sections 4, 6, an operator can widen the gap between the left-hand keys from the right-hand keys, to configure the keyboard 2 into a more comfortable typing position. At any time, the keyboard sections 4, 6 can be rejoined to form a single, rigid structure.

Each section 4, 6 also has one or more kick stands (not shown) mounted on the underside, so the angle of the keyboard surface can be changed with respect to the working surface (e.g., desktop). These kick stands are mounted near an edge 20 of keyboard 2 where the two keyboard sections 4, 6 adjoin. Preferably, each keyboard section 4, 6 has two such stands, both near the edge 20, one near the front edge of the section, and the other near the back edge of the section. When the keyboard sections 4, 6 are separated, the kick stands angle the keyboard sections 4, 6 outward (i.e., the inside edges are elevated so that from the edge 20, the left section 4 slopes downward to the left, and the right section 6 slopes downward to the right). This positioning enables the operator to use the keyboard 2 without much rotation of his hands and wrists from their natural positions and makes for a more comfortable and ergonomic typing position.

In another embodiment, each keyboard section 4, 6 has two sets of kick stands on the underside of the keyboard 2 near an edge 20. One set provides longer stands than the other set so that the operator can choose between the sets to find a comfortable typing angle. So that the keyboard 2 can remain steady on the work surface, the operator should choose front and rear kick stands of the same height.

The keys 8, 14, and 16 (hereafter, collectively keys 8) have a generally concave, depressed surface with a round perimeter or rim (e.g., oval, circular). In one embodiment, the rim is approximately flush with a top surface of the keyboard 2. The concave shape can provide tactile feedback to the operator about the orientation of his fingers relative to the keys 8. The operator senses when a finger touches the side of a concave key 8, and can adjust his hand position accordingly for the next key activation. This continual orientation feedback helps the operator keep his fingers in the proper positions, i.e., centered over the keys 8 rather than drifting across the keyboard 2. In one embodiment, the concave surface of each key is made of a soft, gel-like substance. The softness of the key 8 provides a comfortable feel to those fingers that actually touch the key surface, although touching the surface is not necessary to activate the key. This soft surface also reduces typing strain, compared to the rigid surface of keys on traditional keyboards. In another embodiment, described below, the concave surface of each key 8 is translucent or transparent.

Other arrangements, shapes, and sizes of the keys 8 on the keyboard 2 can be employed without departing from the principles of the invention. Keys, particularly special function keys, can be arranged in different positions on the keyboard 2. Also, although the keys 8 are preferably round in shape, oval or square-shaped keys can be used to practice the principles of the invention.

The distance between the centers of the keys 8 approximates the distance between key centers on a typical computer keyboard. The size of each key 8 is designed to be sufficiently large to receive comfortably the finger tips of human operators. Some keys 8 are larger than others, in accordance with standard keyboards in which some of the special keys (such as ENTER, TAB, CTRL, and SHIFT) are larger to facilitate typing. The space bars 18 (one on the left section 4 and one on the right section 6 of the keyboard 2) are the largest of all the keys, being typically activated with an operator's thumbs.

The keys 8 do not employ any mechanical or moving parts. Below the rim of each key 8, a beam of light is transmitted across the breadth of the key 8. When this beam of light is broken, the key is considered to be activated. Thus, the keyboard 2 is not subject to mechanical failure because of worn-out keys. Also, the absence of moving keys eliminates any need for crevices between adjacent keys. This avoids problems with dirt and food particles accumulating within the keyboard 2, which can cause the keyboard to malfunction. Further, the top surface of the keyboard 2 can be sealed, thereby protecting the keyboard 2 against liquid spills, which are another cause of keyboard malfunctions. The sealed surface of the keyboard 2 also cleans more easily than keyboards with inter-key crevices.

Activation of a key 8 in accordance with the invention can occur without sound. Optionally, the keyboard 2 of the invention is configured to produce a sound whenever a key is activated, with one or both of the speakers 10 emitting that sound. These speakers 10 are secured to an underside of a top surface of the keyboard 2 (e.g., with screws); and the positioning of the speakers 10 directs the sound toward the operator.

A keyboard controller (circuitry internal to the keyboard 2) converts the key activations into the appropriate signals for transmission to the computing device. This transmission can be wireless or by traditional computer keyboard cables. The keyboard 2 requires a small amount of electrical power in order to operate. This power can be supplied by an AC adapter, internal batteries, or by a Universal Serial Bus (USB) cable (a USB cable can not only provide data transmission capabilities, but also provide a small power supply that can be used by the keyboard 2).

The cable 12 passes through an opening in a back wall of the keyboard 2. Power and ground wires provide power and ground connections for the keyboard electronics housed therein. If additional power is needed, the cable 12 can include two extra 16-gauge wires for positive and negative power to the keyboard 2. Accordingly, transmission of data and power between the keyboard 2 and computing device is achieved by a single cable. In this instance, the cable 12 has a jack near the computer connector (approximately one foot from the end) for an AC adapter. In another embodiment, the keyboard 2 includes a battery power source to provide the necessary power for the light emitters and detectors, and, optionally, for the key illumination effects and key click sounds (described below).

Figure 2A:
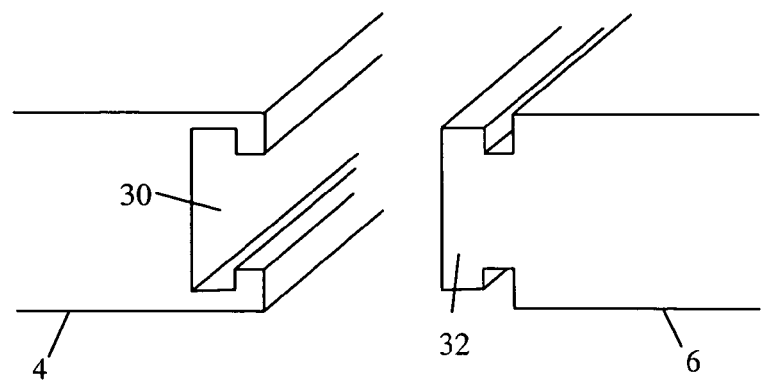
FIG. 2A is a perspective, cross-sectional view of the interlocking edges of an embodiment of a keyboard having the two separable keyboard sections.

FIG. 2A shows an embodiment of an attachment mechanism for joining the left section 4 to the right section 6 along the edge 20 (FIG. 1). The attachment mechanism can be used for embodiments of keyboards having separable sections 4, 6. The left section 4 includes a groove 30 on its right edge for slidably receiving a T-shaped tongue 32 formed along the left edge of the right section 6. The groove 30 extends for most of the length of the right edge of the left section 4. One end of the groove 30 is closed to stop the tongue 32 from further sliding when the sections 4, 6 are joined. In another embodiment, the left section 4 has the tongue 32 and the right section 6 the groove 30.

Figure 2B:
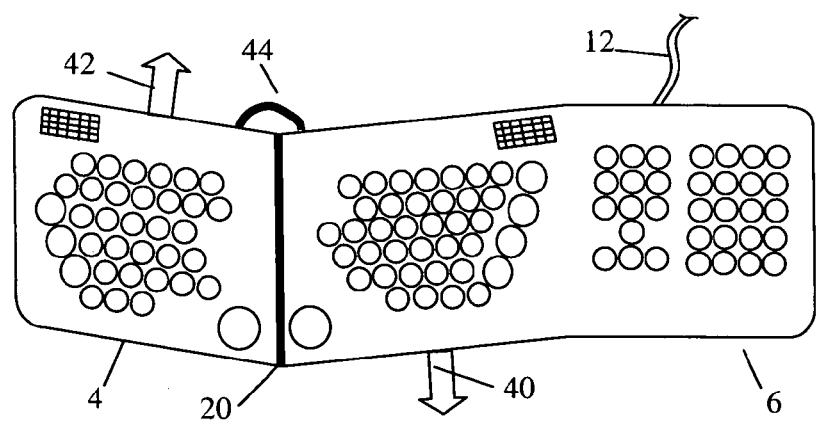
FIG. 2B is a top view of the keyboard of FIG. 2A showing the directions of motion used to detach the two separable keyboard sections.
Figure 2C:
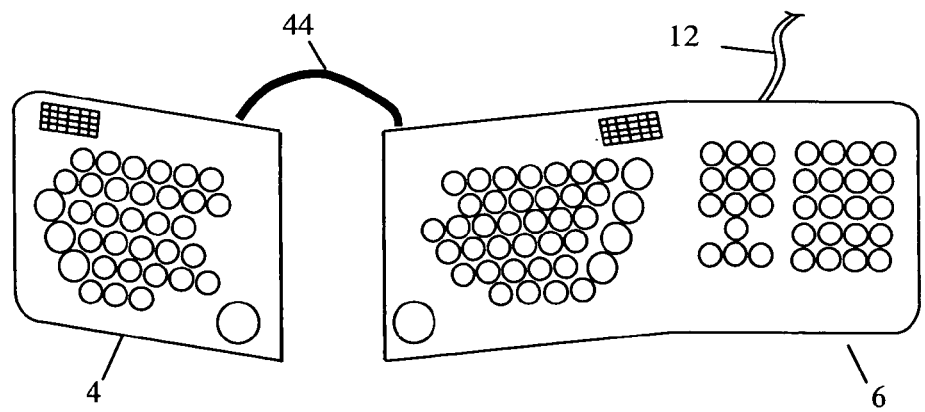
FIG. 2C is a top view of the keyboard of FIG. 2A showing the two sections fully detached from each other.

The attachment mechanism permits an operator to use the keyboard as a single, joined structure, which is a preferred configuration when placing the keyboard 2 on the lap, or as separate keyboard sections. As illustrated in FIG. 2B, the operator achieves the separation by sliding the right section 6 forward (arrow 40) while sliding the left section 4 rearward (arrow 42) using a transverse motion in the plane of the working surface. As shown in FIG. 2C, after the two sections 4, 6 are separated, a data and power cable 44 connects them together to deliver electrical power to the left section 4 and to exchange data between the two sections 4, 6. The cable 44 is sufficiently long (e.g., twelve inches) to permit the keyboard sections 4, 6 to be joined and detached in the described sliding motion. After the keyboard sections are separated, the operator can space them apart to a desired spacing for comfortable typing.

To rejoin the keyboard sections 4, 6, the operator aligns the front end of tongue 32 with the open end of the groove 30, and then slides the right section 6 rearward while sliding the left section 4 forward. The groove 30 slidably interlocks with the tongue 32. This sliding continues until tongue 32 reaches the closed end of the groove 30, at which point the keyboard section 4, 6 are fully joined. Any excess cable 44 exposed when the keyboard sections 4, 6 are joined can be pushed into behind each keyboard section 4, 6.

Figure 3:
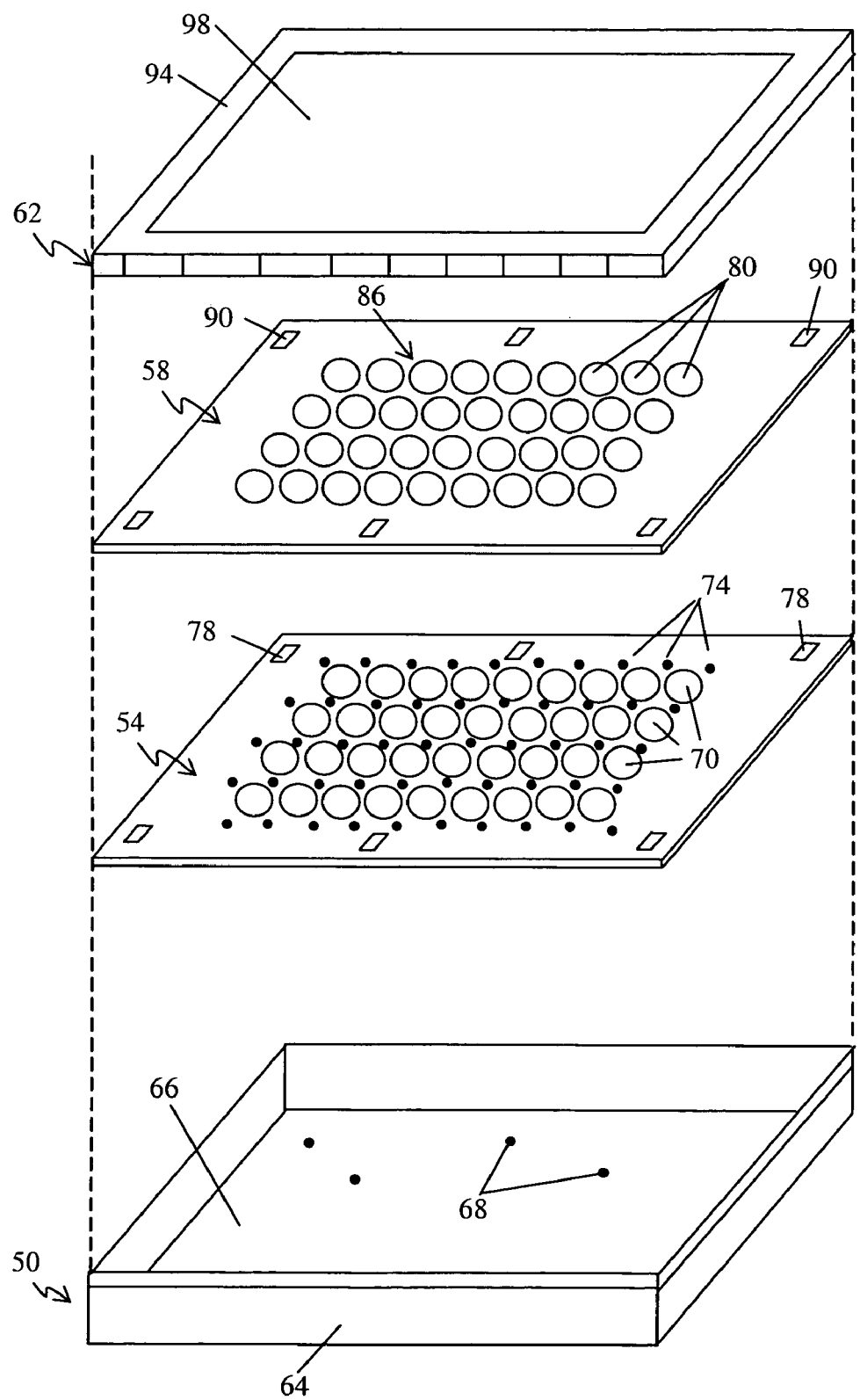
FIG. 3 is an exploded view of an embodiment of one of the sections of the keyboard including a base layer, key layer, working layer, and a top layer.

FIG. 3 shows an exploded view of an embodiment of the left section 4 of the keyboard 2, including a plurality of layers 50, 54, 58, and 62. The right section 6 of the keyboard 2 is constructed similarly, although not shown. In one embodiment, the base layer 50 is constructed of a rigid, lightweight material, such as molded plastic. The plastic is approximately 2-4 mm thick. The base layer 50 includes a plurality of sidewalls 64 and an approximately rectangular base 66. The shape and size of the base layer 50 is primarily determined by the number and arrangement of keys that are included in the section. For instance, the base layer 50 for the left section 4 is shaped differently than the base layer 50 for the right section 6.

The sidewalls 64 are approximately 2.5-3.5 cm in height. Although not depicted in FIG. 3, the sidewalls 64 slope upwards toward the edge 20 (FIG. 1) of the keyboard 2. Thus, the left keyboard section 4 slopes up to the right, and the right section 6 slopes up to the left. This sloped keyboard surface provides an ergonomic shape for comfortable typing. The base 66 includes openings 68 for receiving protrusions from one of the other layers above to secure that layer to the base layer 50.

The layer 54 (referred to as the key layer) is disposed adjacent to and above the base layer 50. The key layer 54 is a thin (e.g., 2-3 mm), planar, opaque, rigid layer that includes a plurality of concave depressions. Each concave depression corresponds to one of the keys 8 (FIG. 1). These concave depressions form key wells 70. In one embodiment, the top surface of the concave depression of each key well 70 is coated with a highly reflective material to form a mirrored surface, e.g., aluminum foil, for reflecting light, as described in more detail below. The key wells 70 are approximately 2 cm in diameter (for most keys, special keys such as the space bar 18 have larger wells), and approximately 2 cm deep as measured from the plane of the top surface of the key layer 54. Like the base layer 50, the key layer 54 can be constructed of molded plastic. The separation between the key layer 54 and the base layer 50 provides sufficient space for electronics (i.e., circuitry) mounted beneath the key layer 54. In some embodiments, the electronics are attached to the underside of key layer 54, mounted on a separate circuit board, or combinations thereof.

Each key well 70 has a pair of openings 72 (FIG. 7) located on opposite sides of and below the rim of the key well 70. The openings 72 are in a sidewall or sidewalls formed by the concave depression of the key well 70. Each opening 72 is approximately 2 mm in diameter. These openings 72 permit a light beam (e.g., infrared) to exit from one of the opening in a sidewall, pass across an open region formed by the concave depression, and enter into the opening on the opposite sidewall of the key well 70. For embodiments having circular-shaped keys 8, the holes are preferably positioned on the diagonals of the key well 70 with respect to the geometry of key layer 54. This arrangement makes efficient use of space available for placement of a light emitter and light detector for each key 8.

Each key well 70 is surrounded by a plurality of openings 74 for firmly securing the key layer 54 to the layer 58 (further illustrated in FIG. 5) to prevent the layers 54, 58 from sliding across one another.

The lower portion of the key layer 54 includes protrusions (not shown) that provide the necessary physical support for the key layer 54 and the working layer 58. Each protrusion has a threaded hole at the bottom which is used to secure the key layer 54 to the base layer 50 using fasteners, such as metal screws. The screws are inserted from the underside of the base layer 50 through the provided holes (see FIG. 6). The screws are then attached to the protrusions in the key layer 54, which are positioned to align with the holes 68 in the base layer 50. The head of each screw is larger than the size of the hole 68, so that tightening the screw tightens the key layer 54 against the keyboard base layer 50. After being secured, the key layer 54 provides a sturdy subsurface for the working surface (i.e., layer 58).

The layer 58 operates as a working surface of the keyboard 2, and is thus referred to as the working layer 58. The working layer 58 is disposed adjacent to and above the key layer 54. The working layer 54 is a thin (e.g., 2-3 mm), planar layer constructed of a non-colored, transparent or translucent, soft rubber or gel-like resilient material, an example of which is a soft, rubber material used for small suction cups. The working layer 58 includes a plurality of concave depressions with generally round rims. Each depression is approximately 2 cm in diameter for most keys and is larger for special keys, such as the space bar.

Figure 4:
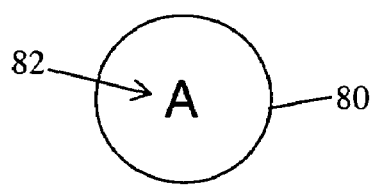
FIG. 4 is a top view of an embodiment of a circular key well of a single key identified by a label centered therein.

Each concave depression corresponds to one of the keys 8 and forms a key well 80. On the top surface of the concave depression, approximately centered within each key well 80, a label or identifier 82 (FIG. 4) indicates the character typed (e.g., q, w, e, r, t, y) or action performed (e.g., ENTER) by activating that key. The labeling can be accomplished in a variety of ways, including printing and painting using ink or paint suitable for achieving permanence on the working layer 58, despite potential repeated contact with the fingertips of an operator.

Each key well 80 of the working layer 58 is aligned with one of the key wells 70 of the key layer 54. The depressions of the working layer 58, which are approximately 4-7 mm in depth, are shallower than those of the key layer 54. Accordingly, when the working layer 58 is secured above the key layer 54, a vertical clearance between the underside of the working layer key well 80 and the top surface of the key layer key well 70 defines a volume for each key 8. In one embodiment, this vertical clearance is approximately 1.5 cm.

An alternative embodiment of the keyboard 2 does not include the working layer 58. Such an embodiment, however, lacks the advantages of the working layer 58, such as providing a soft surface for the keys 8, helping distribute light within a key, and keeping fingers from touching the key wells 70 of the key layer 54.

The top layer 62 is disposed adjacent to and above the working layer 58, and provides a narrow frame 94 around the outer top edges of the working layer 58. The frame 94 defines an opening 98 for access to the keys 8. The top layer 62 is joined to the base layer 50. The outer peripheral edge of the top layer 62 matches the contour of the sidewalls 64 of the base layer 50 to form a smooth interface between the two layers 50, 62 when joined, thus minimizing any visual indication of the interface.

Figure 5:
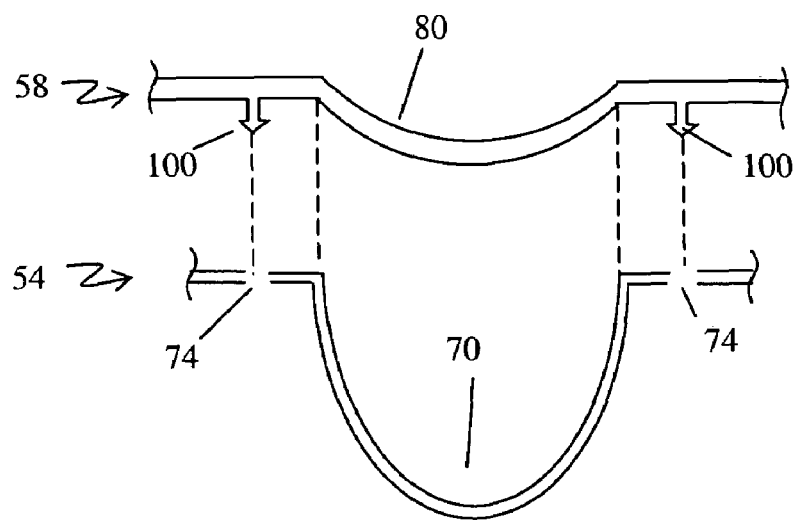
FIG. 5 is a cross-sectional view of an embodiment of an interlocking mechanism for attaching the working layer of the keyboard to the key layer, and thereby aligning the key wells of the respective layers to form a zero-force key of the invention.

FIG. 5 shows a cross-sectional view of the key layer 54 and working layer 58 for a single key 8. As described above, a key well 80 of the working layer 58 is aligned above a key well 70 of the key layer 54. For securing the working layer 58 to the key layer 54, the underside of the working layer 58 has a plurality of small protrusions 100 formed of the same material as the rest of the working layer 58. The protrusions 100 align with the openings 74 of the key layer 54. In one embodiment, each of these protrusions is a short cylinder with a widened, then tapered end like an arrowhead. The cylindrical portion of the protrusion is approximately equal in length to the thickness of key layer 54, so that the arrow head of each protrusion 100 passes completely through the opening 74 and locks onto the underside of the key layer 54. This interlocking also prevents the working layer 58 from falling away from the key layer 54 if the keyboard 2 is turned upside down. The material of the protrusions 100 is sufficiently resilient to permit the working layer 58 to be pulled apart from the key layer 54 when disassembling the keyboard 2.

Figure 6:
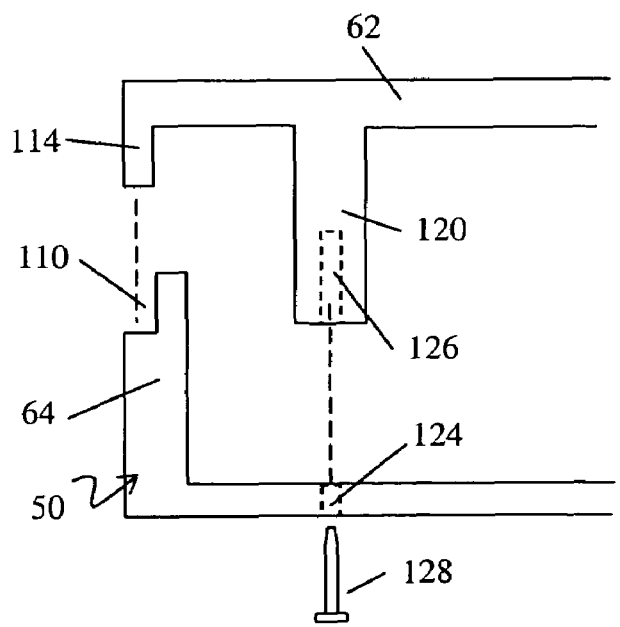
FIG. 6 is a cross-sectional view of an embodiment of an attachment mechanism for joining the base layer of the keyboard to the top layer.

FIG. 6 shows an embodiment of an attachment mechanism for joining the base layer 50 of the keyboard to the top layer 62. The sidewall 64 of the base layer 50 has an upper edge. A portion 110 of the sidewall 64 (e.g., 1 cm) at the upper edge is thinner than the base of the sidewall 64 and stepped inward. The top layer 62 has a vertical edge 114 extending down that overlaps this portion 110 of the keyboard base layer 50. The thickness of the vertical edge 114 corresponds to the thickness of the stepped in portion 110 so that the top and base layers 62, 50 form a smooth interface when joined together. The overlap helps prevent spilled liquids from seeping into the keyboard 2. The top layer 62 also has a plurality of supports 120 that pass through the holes 78 and 90, (FIG. 3) in the key layer 54 and working layer 58, respectively. The supports 120 of the top layer 62 align with holes 124 in the base layer 50. The ends of the supports 120 have a threaded bore 126 extending partially therethrough. A screw 128 enters the hole 124 from the underside of the base layer 50 and threads into the bore 126 of the support 120.

Figure 7:
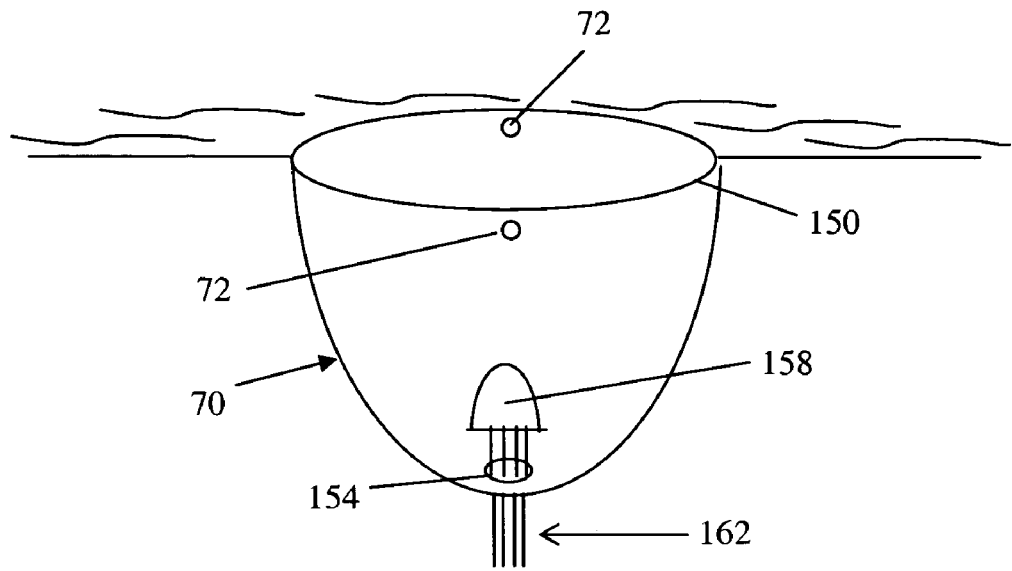
FIG. 7 is a side view of an embodiment of a single key well at the key layer of the keyboard.

FIG. 7 shows an embodiment of a representative one of the key wells 70 formed in the key layer 54 of the keyboard 2. The sidewall of the key well 70 includes a pair of openings 72 below and near the rim 150. The openings 72 are opposite each other. In one embodiment, the openings 72 are sufficiently aligned with each other to enable a narrow beam of light emitted from one of the openings 72 to enter into the other of the openings 72. In another embodiment, the openings 72 are not directly aligned with each other, but so disposed so that light (e.g., a divergent beam) entering the key well 70 through one opening 72 reaches the other opening 72.

At the base of the key well 70 is another opening 154 for permitting electrical wires or leads to pass therethrough. In one embodiment, this opening 154 is approximately 0.5 cm in diameter. An LED (light-emitting diode) assembly 158 is disposed above the opening 154 within the interior of the key well 70 such that the electrical leads 162 of the LED assembly 158 extend through the opening 154. In this embodiment, the LED assembly 158 is larger than the diameter of the opening 154. Although the keyboard 2 uses LEDs to illuminate the keys 8, other types of light sources can be used to practice the invention. Preferably, the light source provides long-lasting, high output intensity light that consumes a small amount of electrical power.

Although the keyboard 2 of the invention is described primarily as having an individual light source (e.g., LED assembly) for each key 8, another embodiment of the keyboard 2 has centralized light sources, wherein light is delivered to the keys by means of fiber optic cables. For example, one central light source provides light for illuminating all active keys, another central light source for illuminating all idle keys, and another light source for producing the light beams that traverse the key wells of the keys. Reliability is integrated into the configuration by using multiple LED bulbs for each central light source. If one or more bulbs in a central light source were to extinguish, the operator may not notice, except perhaps for a dimming of the keys.

Figure 8:
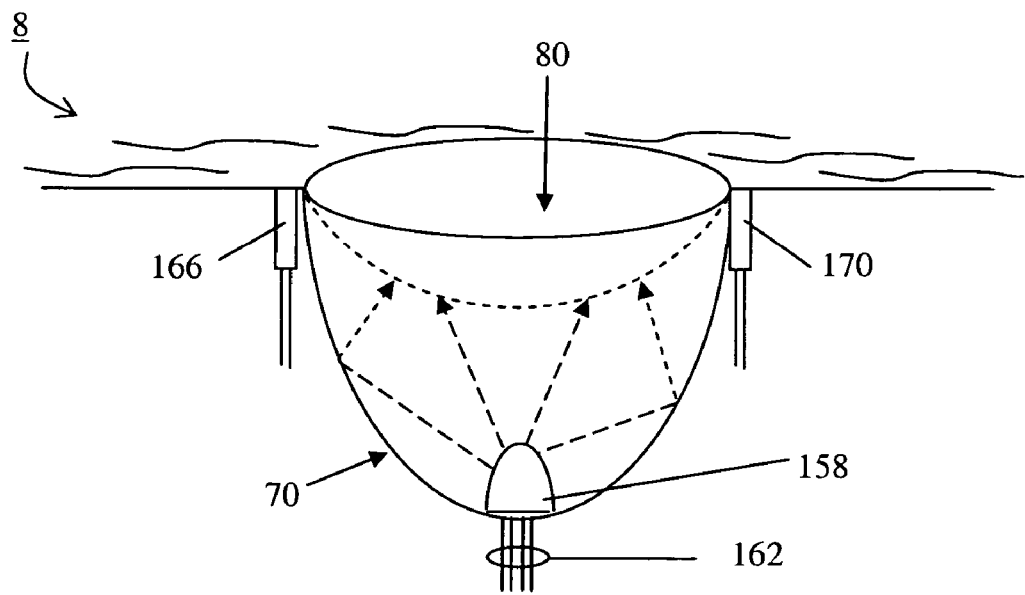
FIG. 8 is a side view of an embodiment of a single key including a light emitting diode (LED) assembly, wherein light emitted by the LED assembly reflects off of the sidewalls of the key well of the key layer and illuminates the key well of the working layer.

FIG. 8 shows an embodiment of a key 8 formed by aligning a key well 80 of the working layer 58 with a key well 70 of the key layer 54. Near the rim of the key well 80 of the working layer 58 are two openings (not shown) on opposite sides of the key well 80. Each opening is approximately 2 mm in diameter and is aligned with one of the openings 72 in the key well 70 of the key layer 154. In one embodiment, to facilitate the transmission of the light beam through the sidewall of key well 80, a short length of fiber optic cable (not shown, approximately 2 mm in thickness) is inserted through the aligned holes of key well 70 and key well 80. The length of the fiber optic cable approximates the combined thicknesses of the sidewalls of the key wells 70 and 80, plus the size of any gap between the sidewalls of the two key wells 70, 80. The fiber optic cable can be glued into place within the openings. The end of the fiber optic cable that faces the interior of key well 80 is slanted to match the slope of the inner key well wall, so that the end of the cable and the key well wall form a smooth surface.

A light emitter 166 and a light detector 170 are positioned on opposite sides of the key wells 70 and 80. The key well 70 provides a firm seating for attaching the emitter 166 and detector 170 components to the outer surface of the key well 70. For additional stability, the emitter 166 and detector 170 are glued into their fully seated positions. The electrical leads of the emitter 166 and detector 170 extend downward from the underside of the key layer 54 for connection to additional circuitry.

Preferably the light emitter 166 and light detector 170 operate with infrared light because infrared light and the light emitted by the LED assembly 158 do not interfere with each other. Both the light emitter and detector active elements are positioned closely to and can abut the end of the short fiber optic cables that extend through the openings at both sides of the key wells 70, 80. Closer positioning enables the fiber optic cable to capture more of the emitted beam of light. Also, circuitry can be employed to account for ambient lighting conditions, which might include high intensities in the frequency range used for the key activation light beams. The emitter beam is aligned with one of the openings 72 in the sidewall of the key well 70 so that the emitter output beam is aimed directly at the opening 72 on the opposite side of the key well 70, where the light detector 170 is located. The light detector 170 is oriented such that the beam of light passing through the opening 72 in the key well 70 shines on the most sensitive area of the light detector 170.

The LED assembly 158 is disposed within the volume formed between the two key wells 70, 80, specifically at the base of the key well 70, as described in FIG. 7, and provides individual illumination of the key 8 within which it is situated (i.e., each key 8 has its own LED assembly 158 and can be illuminated independently of the other keys 8 of the keyboard 2). Independent illumination, as used herein, refers to the ability to control the illumination of the one key 8 by itself (i.e., without any dependence or influence on the control of illuminating the other keys).

When the LED assembly 158 emits light, the mirrored surface of the key well 70 reflects the emitted light and directs the light to the underside of the key well 80 (FIG. 8). Because the key well 80 is translucent, the distributed light illuminates the entire key. Contrasted by the surrounding light, the opaque label on the top surface of the key well 70, which identifies the function or character associated with the key, shows clearly. The LED assembly 158 within each key 8 thus illuminates the key from below to achieve a glowing effect. This feature permits the operator to use the keyboard in low light conditions and still be able to readily discern the location of each key and its function. The operator can also vary the intensity of the illumination.

In other embodiments, the individual and independent illumination of the keys 8 of the keyboard 2, as described herein, can be implemented with keys of conventional keyboards (i.e., with a different key structure than the key wells 70 and 80, such as mechanical or push button keys), provided such keys have a transparent or translucent surface to permit the light from the light source to shine through the surface.

Figure 9A:
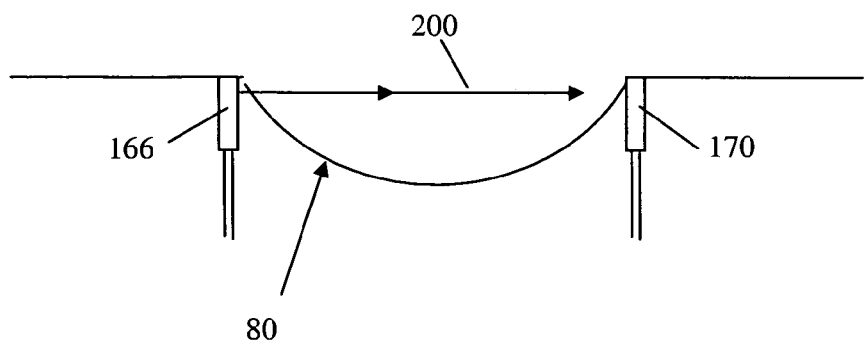
FIG. 9A is a side view of an embodiment of a single key including a light emitter and a light detector on opposite sides of a key well of the key, wherein a beam of light emitted by the light emitter traverses the key well to impinge upon the light detector.
Figure 9B:
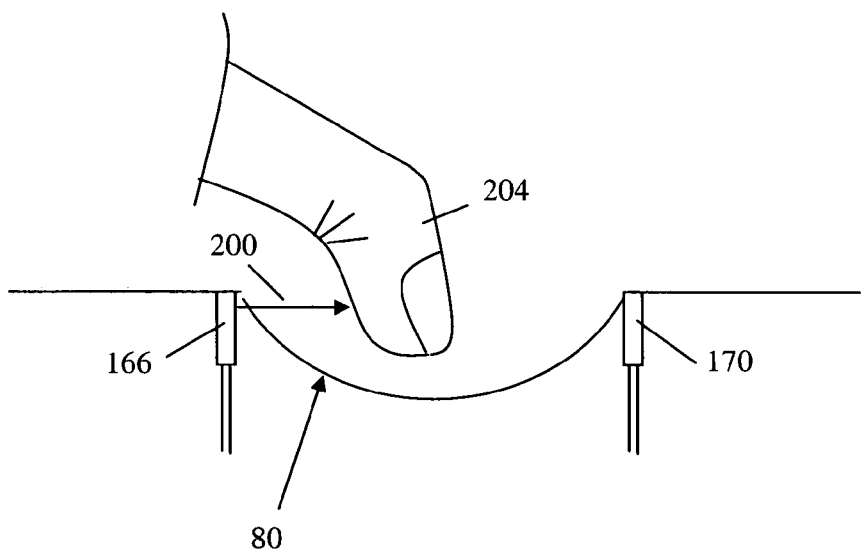
FIG. 9B is a side view of the single key of FIG. 9A illustrating a means for activating the key by obstructing the beam of light.

FIG. 9A and FIG. 9B illustrate an activation of a key in accordance with the principles of the invention. The light emitter 166 produces a beam of light 200 near the rim of the key 8. The fiber optic cable (not shown) capturing the emitted beam 200 transports the light beam 200 through the key wells (of which only the key well 80 is shown). The light beam 200 travels across the open region of the key well 80 towards the fiber optic cable (not shown) at the opposite side. On the opposite side, the other fiber optic cable (not shown) captures the beam 200 and guides it directly toward the detector 170. FIG. 9B shows a finger 204 of a keyboard operator obstructing the beam of light 200 from reaching the light detector 170. By so doing, the operator activates the key 8, causing the generation of a key event associated with that key 8. The keyboard controller (described below) transmits a signal representing the key event to the computing device.

Because obstructing the beam of light 200 requires no physical contact with the keys 8, the fingers of the operator never need to actually touch the keys, thus avoiding any strain associated with pressing keys to type. This elimination of typing strain helps prevent the onset of RSI symptoms and is therapeutic to those already suffering from RSI symptoms. Although unnecessary to activate the key 8, the operator may touch the sidewall or the bottom of the key well 80 during the keystroke. When the operator raises the finger 204 out of the key well 80, the key is released. If the operator obstructs the light beam 200 for longer than a configurable period of time (e.g., one second), the key event repeats continually (depending on the configuration of the computing device).

Each key 8 of the keyboard 2 is in one of two states: active or idle. Typically, each key 8 is in the idle state. When the operator obstructs the beam of light 200, the key 8 transitions to the active state. When the light beam is no longer obstructed, the key 8 returns to the idle state. The keys that involve locking, for example, caps lock, number lock, and scroll lock, have active and idle states that are defined differently from that of other keys. For lock keys, when that key is activated, the lock becomes active, and remains active although the light beam is no longer obstructed. This lock modifies the output of subsequently typed characters. For example, when the caps lock is active, each alphabetical key produces the opposite case format (uppercase, lowercase) than the case format typed by the operator. The operator removes the lock by obstructing the light beam again (thus toggling the lock on and off).

Figure 10A:
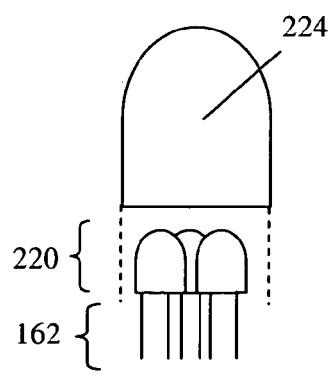
FIG. 10A is a side view an embodiment of an LED assembly including red, blue, and green LED lights and a translucent cap.
Figure 10B:
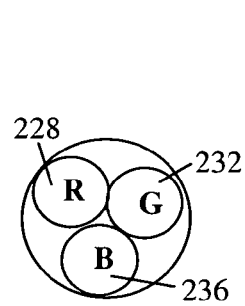
FIG. 10B is a top view of the embodiment of LED assembly of FIG. 10A with the LED lights disposed within the translucent cap.
Figure 10C:
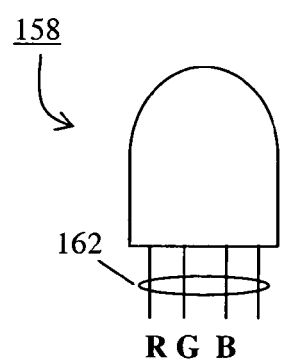
FIG. 10C is a side view of the embodiment of the LED assembly of FIG. 10A.

FIG. 10A, FIG. 10B, and FIG. 10C show an embodiment of the LED assembly 158 of FIG. 7 including a plurality of LEDs 220. FIG. 10A illustrates a translucent cap 224 that is stretched over the top and around the group of LEDs 220. The LEDs 220 are arranged within the cap 224 so that the electrical leads 162 of negative polarity are adjacent to each other. FIG. 10B shows that the plurality of LEDs 220 includes a red LED 228, a green LED 232, and a blue LED 236, each within a separate transparent housing. The translucent cap 224 helps diffuse and mix the LED RGB colors so that the operator does not see three separate RGB LED light sources within the key well 70, but rather a single light source of the combined color.

The negative LED electrical leads are soldered together. FIG. 10C shows the four electrical leads 162 for each LED assembly 158: 1) the common negative (or ground connection), 2) power to the red LED 228, 3) power to the green LED 232, and 4) power to the blue LED 236. The electrical leads 162 are inserted from the interior of the key well 70 through the opening 154 in the base of the key well 70 (FIG. 7). The LED assembly 158 is too large to pass through the key well opening 154, and is glued into place on the upper surface of the base of the key well 70. The leads of the LED assembly 158 protrude through the key layer 54 and are accessible from the underside of key layer 54.

The LED assembly 158 can produce any color by combining different intensities of red, green, and blue light. By adjusting the relative intensities of the red, green, and blue LEDs, the operator can generate a wide range of colors.

In one embodiment, the LED assembly 158 of each key 8 are off (i.e., do not emit light) when each key is in an idle state. Then when a key 8 is activated, the LED assembly 158 of that key 8 turns on and emanates light of a particular color (the active key color). The lighting of the key 8 provides visual feedback to the operator. This feedback communicates to the operator that the key 8 has been activated and assists those typists who look at the keyboard 2 while typing. The key remains illuminated in the chosen active key color until the operator no longer obstructs the beam 200, at which moment the LED assembly 158 turns off and the key is no longer illuminated. For lock keys, the LED assembly 158 continues to illuminate the lock key in the active key color until the lock is released, as described above. The illumination of the lock keys provides a quick visual cue to indicate those special keys that are currently active, in contrast to conventional keyboards that use small lights to indicate that the key locks are activated.

In another embodiment, the LED assembly 158 of each key 8 illuminates each key in an idle state with an idle key color (selectable by the operator). Then when a key 8 is activated, the LED assembly 158 of that key 8 immediately emanates light of an active key color that is different from the idle key color. This change of color provides the visual feedback described above. The key 8 remains illuminated in the active color until the key 8 is released, at which moment, the color of the key 8 returns to the idle key color. (For special keys, such as Caps Lock, Num Lock, and Scroll Lock, the key 8 remain in the active key color while the lock is on; that is, until the key 8 is activated a second time. Again, the continued illumination of a locked key provides visual feedback to the operator as to which lock keys, if any, are currently active.)

When changing from the active key color to the idle key color, the change can occur immediately or gradually to the idle key color. A gradual change, referred to herein as a fade, can occur over a period of seconds. At a midpoint during the fade, the illumination color is an equal mix of the active and idle key colors. Fading can also be implemented in some embodiments to signify transitions from the idle key color to the active key color. In one embodiment, this fade rate is determinable by the operator.

In another embodiment, the LED assembly 158 has two LEDs. One LED corresponds to the idle key color, and the other corresponds to the active key color. In yet another embodiment, the LED has one LED. This LED is illuminated when the key is activated and unlighted when the key is in an idle steady state. Fading for these embodiments can be achieved by decreasing the brightness of the LED associated with the active key color, while increasing the brightness of the idle key LED, if any.

Figure 11A:
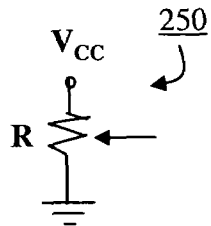
FIG. 11A is a circuit diagram of an embodiment of a key illumination brightness control.

FIG. 11A, FIG. 11B, FIG. 11C, FIG. 11D and FIG. 11E show embodiments of electrical circuits for achieving the functionality of the keyboard 2. The electrical circuits described are merely examples and are not intended to limit the scope of this invention. Many different yet equivalent circuits can be employed to practice the principles of the invention. FIG. 11A shows an embodiment of a rheostat 250 that is connected to a power source (e.g., +5V) of the keyboard 2 and ground. The rheostat 250, also referred to as a key illumination brightness circuit, produces an output voltage referred to a $V_{MAXEFF}$.

Figure 11B:
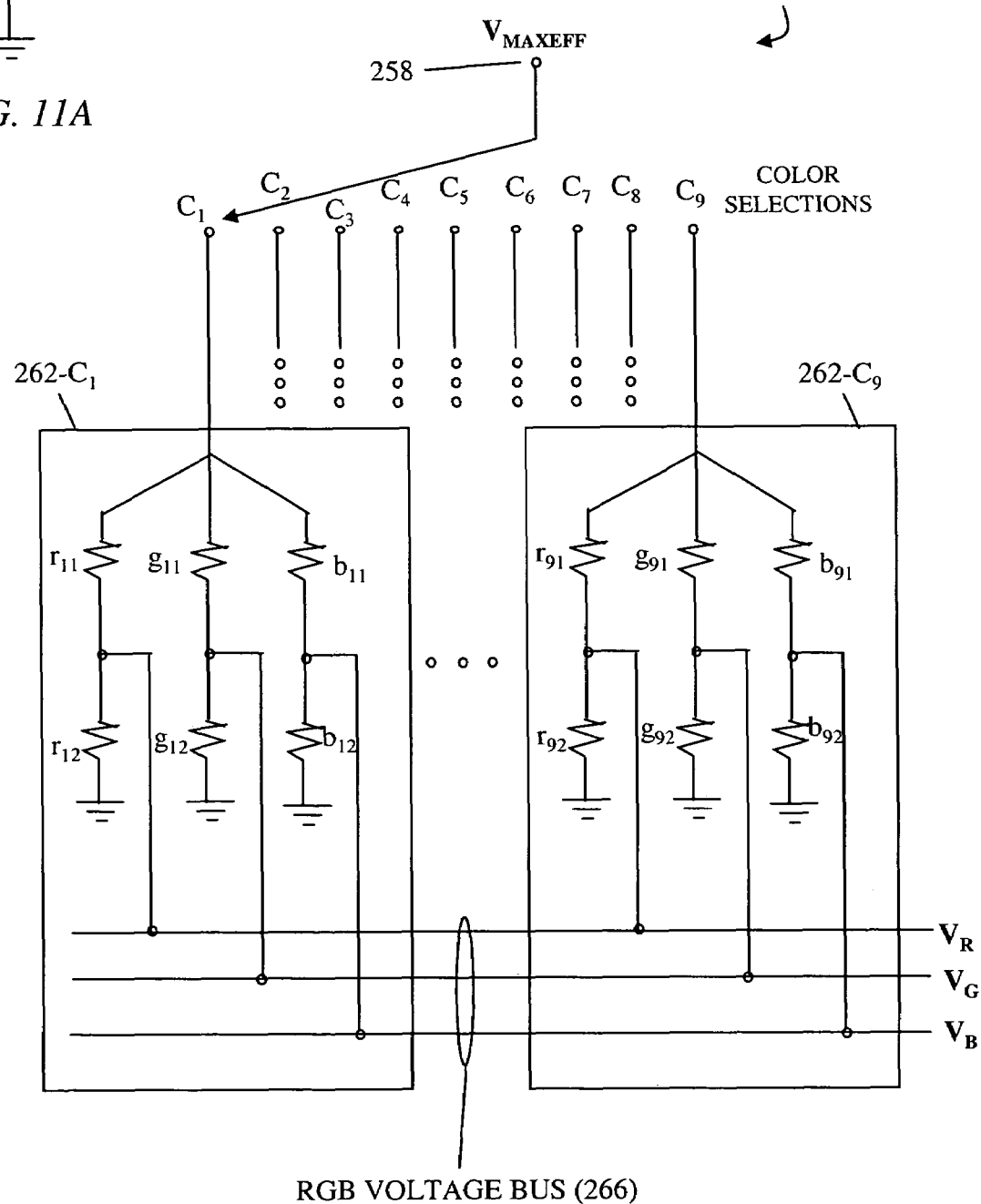
FIG. 11B is a circuit diagram of an embodiment of a key illumination color selector.

FIG. 11B shows an embodiment of a key illumination color selector circuit 254. The keyboard 2 includes two such color selector circuits: 1) for the active key color, 2) for the idle key color. Each color selector circuit 254 is in electrical communication with the brightness circuit 250. The output voltage, $V_{MAXEFF}$, generated by the key illumination brightness circuit 250, is applied to an input terminal 258 of each color selector circuit 254. The voltage ($V_{MAXEFF}$) can be directed to one of a plurality of color circuits 262. Here, for example, are nine color circuits 262 ($c_1 \ldots c_9$). Each key illumination color selector circuit 254 produces the plurality of output voltages $V_R$, $V_G$, and $V_B$.

Each color circuit 262 includes a set of voltage divider circuits. These voltage divider circuits produce the relative voltages for each of the RGB components of the selected color. For example, to produce a red color for color $c_1$, the resistor $r_{11}$ has a relatively small value (e.g., 1K ohm), the resistor $r_{12}$ has a relatively large value (e.g., 100K ohm), the resistor $g_{11}$ has a relatively large value (e.g., 100K ohm), the resistor $g_{12}$ has a relatively small value (e.g., 1K ohm), the resistor $b_{11}$ has a large value (e.g., 100K ohm), and the resistor $b_{12}$ has a small value (e.g., 1K ohm). In this example, this set of voltage divider circuits produces a high voltage for $V_R$, and low voltages for $V_G$ and $V_B$. The output voltages pass to an RGB voltage bus 266 having three output terminals. One output terminal carries a voltage ($V_R$) for the red LED 228, a second output terminal a voltage ($V_G$) for the green LED 232, and a third output terminal a voltage ($V_B$) for the blue LED 236. When the voltages $V_R$, $V_G$, and $V_B$ in the above example are passed to the LED assemblies 158, the red LEDs 228 are bright and the green and blue LEDs 232, 236 are dim, with the net effect being a red key illumination color.

The three output terminals from the idle key illumination color selector circuit 254 carry the RGB voltages for the LED assemblies of keys in the idle (steady) state, and the three output terminals from the active key illumination color selector circuit 254 carry the RGB voltages for the LED assemblies of keys in the active state. To provide visual feedback for the manufacturer of the keyboard 2, the six RGB output terminals can be color-coded to indicate which of the RGB voltages each output terminal carries. Also, striped wires can indicate those output terminals of the active key illumination color selector circuit to distinguish them from those output terminals of the idle key illumination color selector circuit.

Figure 11C:
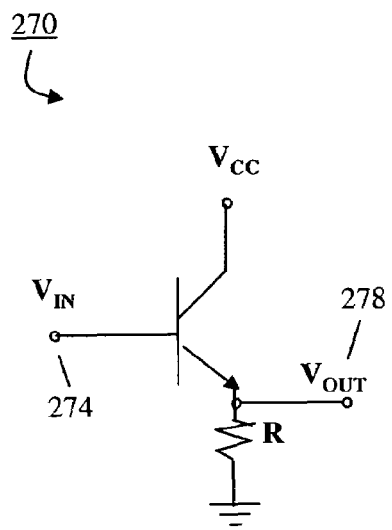
FIG. 11C is a circuit diagram of an embodiment of an emitter-follower circuit.
Figure 11D:
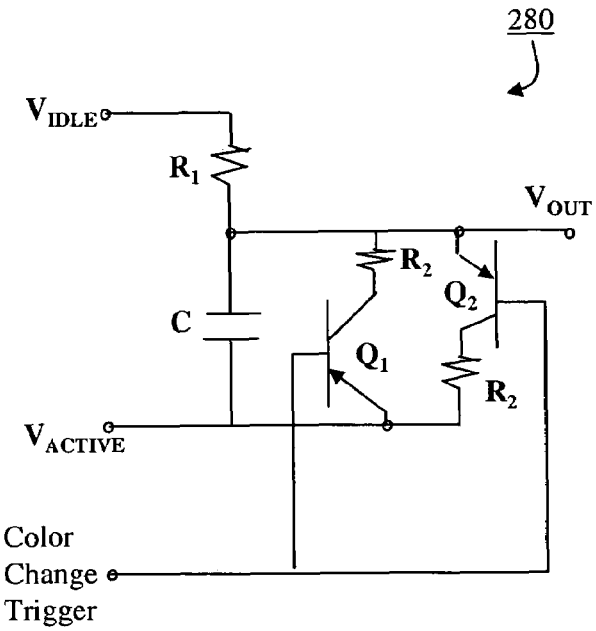
FIG. 11D is a circuit diagram of an embodiment of a key illumination color controller for an LED assembly of a single key.

FIG. 11C shows an embodiment of an emitter-follower circuit 270 having an input terminal 274 and an output terminal 278. Each of the output terminals 266 of the color selector circuits 254, each carrying one of the voltages $V_R$, $V_G$, and $V_B$, is electrically connected to the input terminal 274 of a different emitter-follower circuit 270. Accordingly, in an embodiment with two color selector circuits 254, there are six emitter-follower circuits. The voltage ($V_{out}$) on the output terminal 278 of the emitter-follower circuit 270 is approximately equal to the input voltage $V_{IN}$, there being a difference of 0.6 v. The emitter-follower circuit 270 operates to isolate the high-impedance color selector circuits 254 (FIG. 11B) from the low-impedance input of the color control circuits 280 (FIG. 11D). Otherwise, the operation of the color control circuits 280 can alter the RGB voltages in the color selector circuits 254, and thereby alter the key illumination colors.

The output terminal of each emitter-follower circuit 270 can be color-coded to correspond to the color-coding scheme of the voltage arriving on the input terminal 274. In this embodiment, two groups of three color-coded wires extend from the emitter-follower circuits 270 across the keyboard 2 and are connected to the LED assembly 158 of each key well 70. Each group of wires includes a red wire carrying the power for the red LED 228, a green wire carrying the power for the green LED 232, and a blue wire carrying the power for the blue LED 236. One group of wires is for the selected idle key color RGB voltages $V_R$, $V_G$, and $V_B$, and the other group is for the selected active key color RGB voltages $V_R$, $V_G$, and $V_B$.

FIG. 11D shows an embodiment of a color illumination control circuit 280 for controlling the output voltage for one of the three RGB LEDs. The color illumination control circuit 280 includes an input voltage terminal ($V_{IDLE}$), a second input voltage terminal ($V_{ACTIVE}$), a third input terminal called a color change trigger input, and an output voltage terminal ($V_{OUT}$). Each key 8 in the keyboard 2 includes three such color illumination control circuits 280, one for each of the red, green, and blue LEDs.

For each color control circuit 280 (i.e., one circuit 280 for each of the RGB LEDs), the $V_{IDLE}$ input terminal is connected to an idle key illumination RGB terminal ($V_R$, $V_G$, or $V_B$) of the idle key illumination color selector circuit 254, and the $V_{ACTIVE}$ input terminal is connected to a corresponding active key illumination RGB terminal ($V_R$, $V_G$, or $V_B$) of the active key illumination color selector circuit 254. A key activation detector circuit (FIG. 12) activates the color change trigger to select between $V_{IDLE}$ and $V_{ACTIVE}$ (e.g., choosing between $V_R$ of idle key illumination color selector circuit and $V_R$ of active key illumination color selector circuit). The output $V_{OUT}$ of the color change control circuit 280 is connected to an input terminal ($V_{IN}$) of an emitter-follower circuit (like that shown in FIG. 11C). The output terminal ($V_{OUT}$) of that emitter-follower circuit then powers a single LED (228, 232, or 236) of a single LED assembly 158 of a single key 8. The purpose of this emitter-follower circuit is to isolate the high-impedance output of the color control circuit 280 from the relatively low-impedance circuit of the actual LED light.

Each color control circuit 280 also includes two PNP transistor circuits $Q_1$ and $Q_2$ that are oriented in opposite directions with respect to current flow. This configuration accounts for the two voltage conditions: 1) when $V_{IDLE} >= V_{ACTIVE}$, and 2) when $V_{IDLE} <= V_{ACTIVE}$.

Figure 11E:
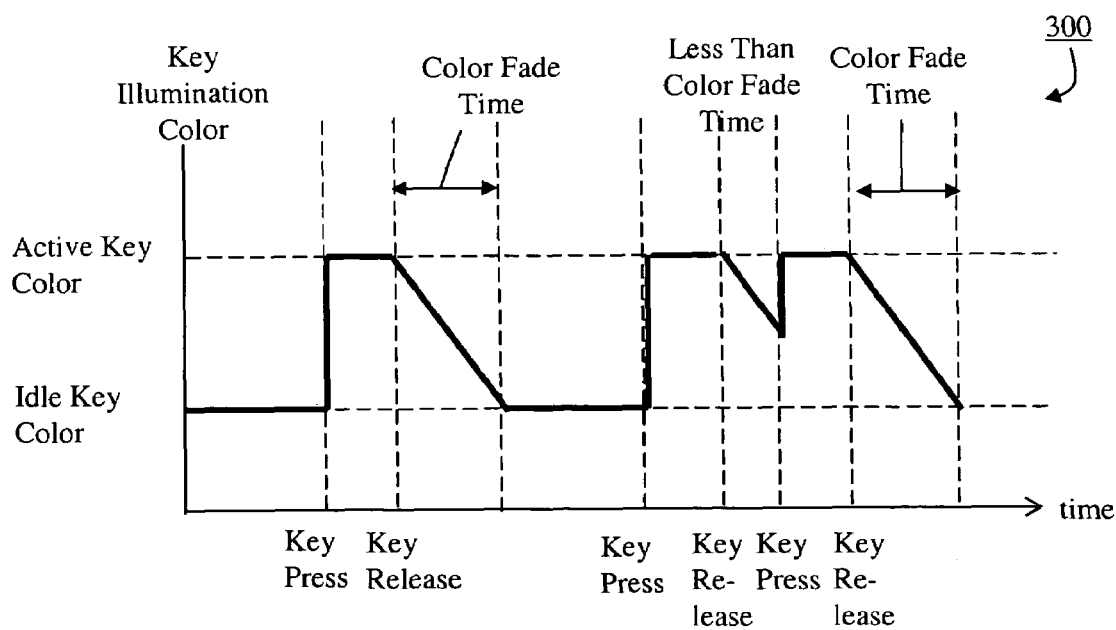
FIG. 11E is a graph showing an exemplary sequence of color transitions for a single key in response to key events.

The operation of each color control circuit 280 is described with reference to a graph 300 shown in FIG. 11E. The graph 300 shows the output illumination color of an LED assembly 158 in response to an exemplary sequence of key activations and releases for a non-locking key. In FIG. 11E, rising edges in the graph 300 indicate key activations, and falling edges indicate key releases. When the operator activates the key 8, by obstructing the beam of light across the top of the key, the key illumination color (for that key only) immediately changes to the selected active key illumination color. That key 8 remains illuminated in this color until the operator no longer obstructs the light beam. When the operator removes the obstruction, the key 8 is considered idle. If the idle and active key colors are set to the same color, the key illumination color does not change when the operator activates or releases each key (i.e., although a switch occurs between the active and idle colors, the operator discerns no change).

In a steady idle state, the capacitor C (FIG. 11D) is fully charged, and the output voltage $V_{OUT}$ is equal to $V_{IDLE}$. When the color change trigger is activated, each PNP transistor $Q_1$ and $Q_2$ (such as a 2N3906 transistor) permits the capacitor C to discharge through a resistor $R_2$. Each resistor $R_2$ is relatively small (e.g., 1K ohm) compared to a resistor $R_1$ (e.g., 100K ohm), so that the capacitor C discharges rapidly through a transistor path. This rapid capacitor discharge causes $V_{OUT}$ to quickly change to $V_{ACTIVE}$ when the key is activated. The voltage signal $V_{OUT}$ remains at $V_{ACTIVE}$ until the operator no longer obstructs the beam of light in the key well.

When the key 8 changes from the active state to idle state, the color change trigger turns off. In response, the capacitor C charges through the resistor $R_1$. While charging, $V_{OUT}$ transitions gradually from $V_{ACTIVE}$ to $V_{IDLE}$. As a result, the LED gradually fades back to the selected idle key color. The fade time is determined by the resistance value of the R1 resistor and the capacitance value of C capacitor of the corresponding color control circuit 280. The keyboard 2 can have a control that permits the operator to vary the key illumination color fade time, or the capacitance and resistor values are fixed (i.e., hardwired) into the circuitry of the keyboard. The fading time constant is calculated as $R_1 \times C$. Because the capacitor voltage is within 1% of its final value after five time constants, the total fading time can be calculated as: $5 \times R_1 \times C$. Typically, the illumination color is not distinguishable from the idle key color after about three time constants. Therefore, the effective fading time can be calculated as: $3 \times R_1 \times C$.

For example, if the fade time constant is two seconds, then when the operator releases the key, it takes approximately six seconds to fade from the selected active key color back to the selected idle key color. During this transition time, the key color will vary continuously through intermediate colors between the two selected key illumination colors.

As shown in FIG. 11E, if an operator activates a key, releases it, and then activates the same key again before the fading process completes, the key 8 immediately returns to the active key color and the fading process restarts. As the operator types on the keyboard, the keys recently activated are in various stages of the color fading process.

Figure 12:
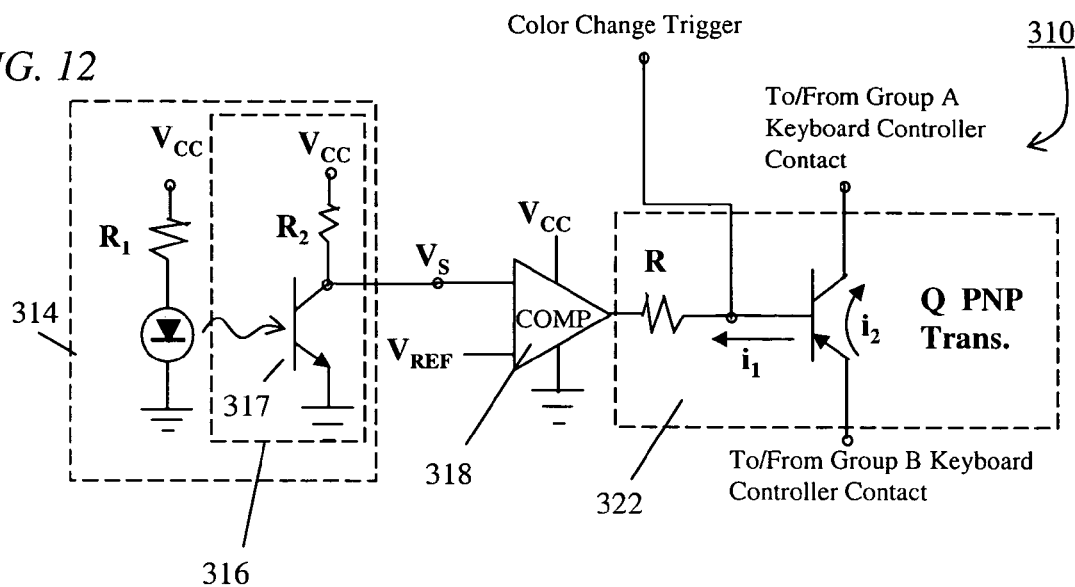
FIG. 12 is a circuit diagram showing emitter and detector circuitry, a key activation detection circuit, and an interface between a detector signal and a keyboard controller.

FIG. 12 shows a key activation detection circuit 310. Each key of the keyboard 2 uses a key activation detection circuit 310 to determine when the beam of light is obstructed. The key activation detection circuit 310 includes an optoelectronic device 314 (i.e., the light detector 170 of FIG. 8, FIG. 9A, FIG. 9B), a comparator 318, and circuitry 322. The optoelectronic device 314 includes a light detector 316, resistors $R_1$ and $R_2$, and a transistor 317. The detector 316 reacts to the incident beam of light and enables current flow based on the intensity of the incident light. The resister $R_2$ creates a voltage drop with respect to the supply voltage ($V_{CC}$) and provides an output signal voltage $V_S$. This output signal voltage $V_S$ is connected to an input terminal of the comparator 318 (e.g., a 339 quad comparator chip, shareable among four keys).

Using a voltage divider circuit, the comparator reference voltage $V_{REF}$ is set to an appropriate voltage (in one embodiment, midway between the typical detector signal voltage when the light beam is obstructed and when the beam is unobstructed (normally +2.5V)). This reference voltage $V_{REF}$ is shared by each of the key activation detection circuits 310 in the keyboard 2.

The output terminal of the comparator 318 is connected to the base of a PNP transistor Q (such as the 2N3906) through a resistor R (hereafter the transistor and resistor are collectively referred to as circuitry 322). The comparator 318 and circuitry 322 convert the analog detector signal to a digital signal.

When the signal voltage $V_S$ is greater than the reference voltage $V_{REF}$, the output voltage provided by the comparator 318 induces a current $i_1$ through the resistor R. The current through the resistor R indicates that the key has been activated. When the current is non-zero, the transistor Q permits a current to flow between the emitter and collector of the transistor. Each of such terminals (labeled Group A terminal and Group B terminal) of the transistor Q is in communication with appropriate terminals of the keyboard controller for that key. The current flow between these two transistor terminals signals the key activation to the keyboard controller. The node between the resistor R and the base terminal of the transistor Q is connected to the color change trigger terminal of the color control circuit 280.

Figure 13:
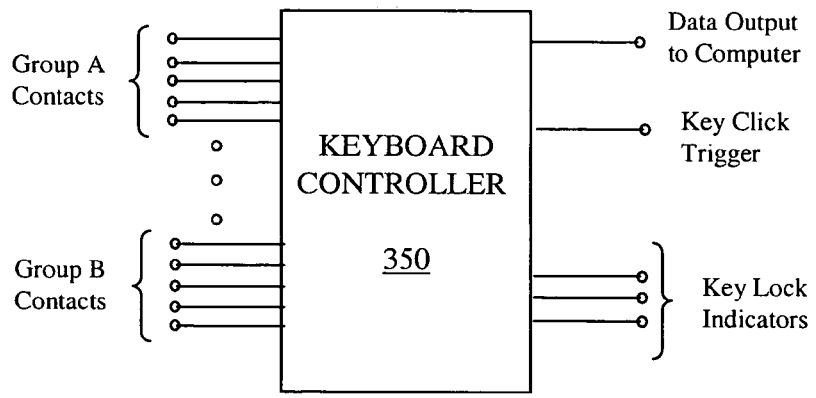
FIG. 13 is a diagram of an embodiment of the keyboard controller.

FIG. 13 shows an embodiment of the keyboard controller 350 including a plurality of input terminals labeled Group A contacts, a plurality of input terminals labeled Group B contacts, an output terminal for triggering a key click, a plurality of output terminals for indicating key locks, and an output terminal for providing data to the computing device. Input signals received from each of the key activation detection circuits (FIG. 12) on the Group A and Group B input terminals determine the character or function that the keyboard controller 350 generates when that key is activated. The keyboard controller 350 can be configured with a variety of unique matrices of Group A and Group B contacts to accommodate various possible key events. The keyboard controller 350 sends the generated key event to the computing device over the corresponding output terminal. Optionally, the keyboard controller 350 sends a key click trigger signal over the corresponding output terminal when a key is activated. This key click trigger signal passes to a key click sound synthesizer circuit (FIG. 14), which plays a chosen sound at a selected volume to indicate the activation of a key.

For the special lock keys (caps lock, number lock, and scroll lock), the appropriate key lock indicator output terminal of the keyboard controller 350 is connected to the color change trigger for the associated key. When a lock is active, the keyboard controller 350 increases the voltage on that lock indicator output terminal. This voltage is used to retain the active key color on these special keys by the connection to the color change trigger.

The operator can optionally activate a key click sound. This short sound is played each time a key is activated. Because typing on this keyboard is nearly silent due to the soft key surfaces and lack of moving parts, some operators may prefer that a synthetic sound be generated for each key event sent to the computing device. The particular sound played and its volume can be selected by the operator using a selector switch on the side of the keyboard. This key clicking sound emanates from small speakers 10 installed in the keyboard 2 and provides the auditory feedback that a key has been activated. The incorporation of the key click speakers 10 into the keyboard 2 also eliminates the complications involved in configuring a computing device to produce the key click sounds through its own speaker(s). Because the volume of the sound can be chosen by the operator, it can be adjusted to suit the operational environment of the typist.

Figure 14:
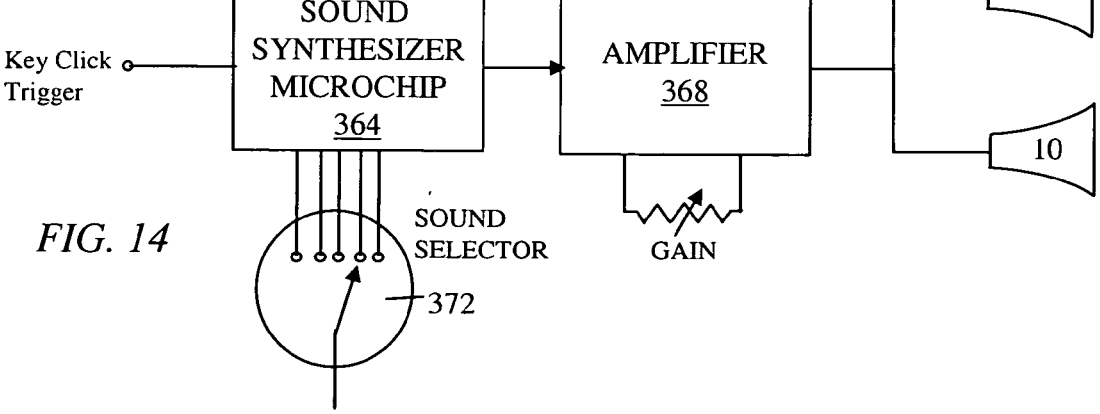
FIG. 14 is a diagram of an embodiment of a key click synthesizer.

FIG. 14 shows an embodiment of a sound generator 360 for generating key click sounds in response to key click triggers from the keyboard controller 350 of FIG. 13. The sound generator 360 includes a sound synthesizer 364, an amplifier 368, a sound selector 372, and the speakers 10 of FIG. 1. The ground wires of the speakers 10 are connected to the keyboard ground, and the positive wires are connected to the speaker amplifier 368.

The sound synthesizer 364 includes an input terminal that is connected to the key click trigger output terminal of the keyboard controller 350 and a plurality of sound selection input terminals for selecting the type of sound generated for each key click trigger signal received. The sound that is played when a key is activated is chosen by the operator using the key click sound selector 372. This selector 372 has several discrete settings corresponding to the sound selection inputs of the sound synthesizer 364. The sound selector 372 is connected to one of the sound selection input terminals, and the operator can change this selection at any time.

Key click sounds are not played when a modifier key is activated. Modifier keys are ones that modify the key event sent to the computing device and include such keys as shift, ctrl, and alt. In one embodiment, modifier keys do not include lock keys: caps lock, number lock, and scroll lock. Accordingly, in this embodiment, the key activation sound plays when any of the lock keys is activated. When the operator activates a non-modifier key, the amplifier 368 amplifies the chosen sound, which plays through the internal keyboard speakers 10 at the chosen volume. The operator can experiment with these settings by varying the sound selection and volume, and then activating any key to sample the audio output.

Figure 15:
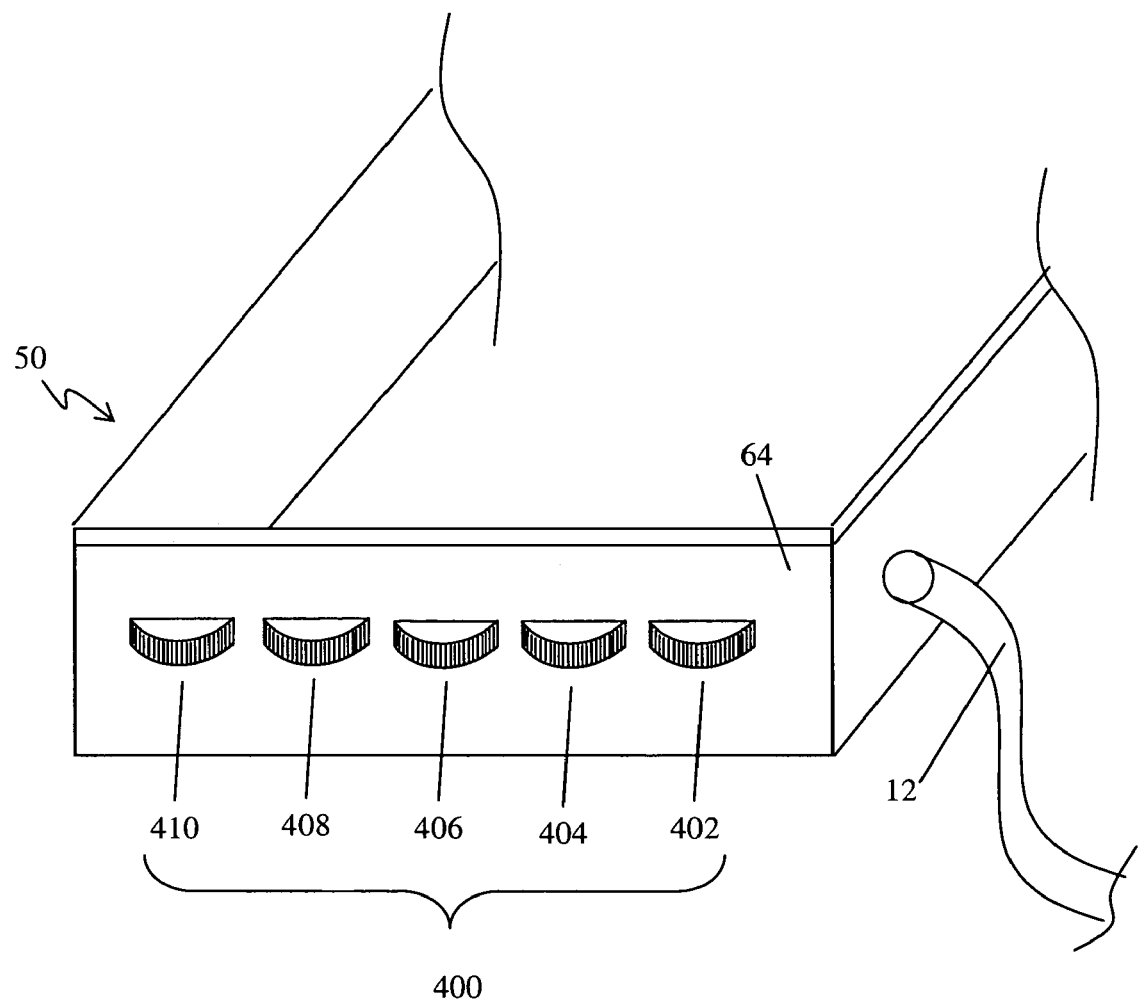
FIG. 15 is a perspective view of an embodiment of side-mounted controls for a plurality of settings.

FIG. 15 shows an embodiment of the base layer 50 (FIG. 3) of the keyboard 2, including a plurality of selectors 400 disposed on a sidewall 64 (here, the right-hand sidewall of the right portion 6). Each selector 400 provides a keyboard feature control. In this embodiment, the selectors 400 are rotatable dials attached to the sidewall 64 from the inside of the base layer 50 by a fastener, such as a screw. Each dial protrudes perpendicularly out of the sidewall 64 of the base layer 50. Around the circumference of the dial are small notches that provide friction to the finger of the operator, so that the operator can turn the dial easily and precisely. Above each dial is a label indicating the purpose of that control.

One of the selectors 400, identified by reference numeral 402, corresponds to a key illumination brightness control, which allows the operator to vary the brightness of the light sources under the keys 8. This control 402 establishes the brightness of all keys 8, affecting the brightness for keys 8 in idle and in active states. Two other selectors correspond to key illumination color selectors 404 and 406. These selectors 404, 406 allow the operator to choose a color for idle keys and for active keys, respectively. Idle keys and active keys have the same selection of colors from which to choose. These possible color selections are predetermined (e.g., by a keyboard designer or manufacturer). Each color selector 404, 406 has a number of discrete settings (e.g., 5, 10). Rotating the dial moves from discrete step to discrete step, each step selecting one of the available colors. The color change resulting from a newly selected idle key color can take effect immediately, and each key in the idle (steady) state are changed to the new color. Those keys that have been recently activated change to an intermediate color between the active key color and the new idle key color, while continuing the color fade process.

Two other selectors correspond to a sound selector 408 and a volume control 410. With the sound selector 408, the operator can enable a key activation sound, i.e., a synthesized a key click, that is played by the internal speakers 10 of the keyboard 2. The operator controls the volume of this sound by adjusting the volume control 410. This volume control 410 has an off setting for when no sound is desired. Otherwise, the volume control 410 is tunable to a desired level, up to the maximum volume.

The general use and operation of the keyboard 2 is now described. Typically, the keyboard 2 rests flat on a work surface in front of the operator. The key surface faces upwards and away from the work surface and roughly centered left to right with respect to the vertical centerline of the operator's body. The keyboard 2 is oriented such that the traditional left-hand keys are located left of the operator's center, and the traditional right-hand keys are located right of the operator's center.

To use the keyboard 2, the operator provides electrical. power (+5V) and ground connections to the keyboard 2. This power can be provided with an alternating current (AC) adapter, by the power transmission wires in a USB (or similar future versions) cable, or by battery power. With a USB cable, the electrical power is provided by the internal power supply of the computing device. In this configuration, the operator does not need to provide a separate power cable or.adapter. When the keyboard 2 powers on, the keys 8 illuminate in the selected idle key color. The operator may connect the cable 12 to the computing device for transmitting key events to computing device, for receiving power, or both. The operator can then adjust keyboard settings for idle and active key colors, key brightness, sound selection, and volume using the selectors 400 (FIG. 15). Such settings are adjustable at any time.

The operator types on the keyboard 2 without (necessarily) making contact with the keys 8. When a finger of the operator breaks the beam of light between the emitter and detector of a given key, that key is activated, and the keyboard controller 350 (FIG. 13) sends a corresponding key event to the computing device.

While the invention has been shown and described with reference to specific preferred embodiments, it should be understood by those skilled in the art that various changes in form and detail may be made therein without departing from the spirit and scope of the invention as defined by the following claims.

What is claimed is:

1. An input device, comprising:
  a key for causing generation of a key event when the key is activated, the key having a concave surface that forms a well with an open interior region defined by sides of the well;
  a light emitter positioned at one side of the well emitting a beam of infrared light across the open interior region to an opposite side of the well; and
  a light detector positioned at the opposite side of the well for receiving the beam of infrared light and for indicating activation of the key when the beam of light is obstructed from being received by the light detector.

2. The input device of claim 1, further comprising a top surface, and wherein the concave surface of the key is depressed below the top surface of the input device.

3. The input device of claim 1, wherein the well is a first well and the key has a second concave surface defining a second well situated above the first well.

4. The input device of claim 1, further comprising a light source illuminating the interior region of the well.

5. The input device of claim 4, wherein the light source illuminates the interior region of the well of the key individually of wells of other keys of the input device.

6. The input device of claim 4, wherein the light source illuminates the interior region of the well of the key with light of a first wavelength when the key is activated and with light of a second wavelength when the key is idle.

7. The input device of claim 4, wherein the light source illuminates the interior region of the well with light of a first wavelength and transitions gradually to illuminating the interior region of the well with light of a second wavelength when a state of the key transitions between an activate state and an idle state.

8. The input device of claim 1, further comprising a speaker for emitting an audible signal in response to an activation of the key.

9. The input device of claim 1, further comprising circuitry for electrically generating an audible signal in response to an activation of the key.

10. A method for generating a key event to be sent to a computing device, the method comprising:
associating a key structure for causing generation of the key event when the key structure is activated;
emitting a beam of infrared light from one side of the key structure to an opposite side of the key structure;
detecting the beam of infrared light at the opposite side of the key structure; and
signaling activation of the key structure upon detecting obstruction to the beam of infrared light.

11. The method of claim 10, further comprising illuminating the key structure in response to the activation of the key.

12. The method of claim 10, further comprising changing a color of illumination of the key structure when the key structure is activated.

13. The method of claim 12, further comprising changing the color of illumination of the key structure to a second color of illumination when a state of the key structure transitions from activated to an idle state.

14. The method of claim 10, further comprising detecting the beam of light at the opposite side of the key structure after the key is activated, and locking the key structure in an activated state until obstruction to the beam of light is subsequently detected.

15. The method of claim 10, further comprising electronically generating a sound in response to the activation of the key structure.

16. The method of claim 15, further comprising selecting the type of sound generated.

17. A keyboard for providing key events to a computing device, the keyboard comprising:
a plurality of keys, each key causing generation of an associated key event when that key is activated; and
a light source system illuminating each key independently of the other keys of the plurality of keys, the light source system including means for illuminating one of the plurality of keys with a first color when the key is activated and for illuminating that one key with a second color when the key is in an idle state.

18. The keyboard of claim 17, wherein the light source system includes means for illuminating one of the plurality of keys with a first color and another of the plurality of keys with a second color.

19. The keyboard of claim 17, wherein the light source system includes means for illuminating one of the plurality of keys with a first color while another of the plurality of keys is unlighted.

20. The keyboard of claim 17, wherein the light source system includes means for illuminating one of the plurality of keys with a first color and for transitioning gradually from the first color to a second color in response to a change in state of that one key.

21. A computing device, comprising an input device for receiving input signals from a user of the computing device, the input device having a plurality of keys, each key causing generation of an associated key event when that key is activated, each key having a concave surface that forms a well with sides and an open region defined by the sides, a light emitter positioned on one side of the well emitting a beam of infrared light across the open region to an opposite side of the well, and an infrared light detector positioned at the opposite side of the well for receiving the beam of infrared light and for indicating activation of that key when the beam of infrared light emitted by the light emitter is obstructed from being received by the infrared light detector.

22. An input device, comprising:
a key for causing generation of a key event when the key is activated, the key having a concave surface that forms a well with an open interior region defined by sides of the well;
a light emitter positioned at one side of the well emitting a beam of light across the open interior region to an opposite side of the well;
a light detector positioned at the opposite side of the well for receiving the beam of light and for indicating activation of the key when the beam of light is obstructed from being received by the light detector; and
a light source illuminating the interior region of the well.

23. The input device of claim 22, wherein the light source illuminates the interior region of the well of the key individually of wells of other keys of the input device.

24. The input device of claim 22, wherein the light source illuminates the interior region of the well of the key with light of a first wavelength when the key is activated and with light of a second wavelength when the key is idle.

25. The input device of claim 22, wherein the light source illuminates the interior region of the well of the key with light of a first wavelength and transitions gradually to illuminating the interior region of the well of the key with light of a second wavelength when a state of the key transitions between an activate state and an idle state.

26. A method for generating a key event to be sent to a computing device, the method comprising:
associating a key structure for causing generation of the key event when the key structure is activated;
emitting a beam of light from one side of the key structure to an opposite side of the key structure;
detecting the beam of light at the opposite side of the key structure;
signaling activation of the key structure upon detecting obstruction to the beam of light; and
changing a color of illumination of the key structure when the key structure is activated.

27. The method of claim 26, further comprising changing the color of illumination of the key structure to a second color of illumination when a state of the key structure transitions from activated to an idle state.

* * * * *